United States Patent [19]
Mochizuki et al.

[11] 4,096,504
[45] Jun. 20, 1978

[54] SHUTTER CURTAIN HOLDER DEVICE

[75] Inventors: Keisuke Mochizuki; Yoshiyuki Nakano, both of Tokyo, Japan

[73] Assignee: Nippon Kogaku K.K., Tokyo, Japan

[21] Appl. No.: 655,410

[22] Filed: Feb. 5, 1976

[30] Foreign Application Priority Data

Feb. 18, 1975 Japan .............................. 50-22384[U]

[51] Int. Cl.² ................................................ G03B 9/28
[52] U.S. Cl. .................................................. 354/241
[58] Field of Search ................ 354/241, 242, 243, 244

[56] References Cited

U.S. PATENT DOCUMENTS

| 2,456,052 | 12/1948 | Doyle et al. | 354/241 |
| 3,735,688 | 5/1973 | Noritake | 354/241 |
| 3,906,531 | 9/1975 | Ishii et al. | 354/243 |

FOREIGN PATENT DOCUMENTS 803,930  11/1958  United Kingdom ................ 354/241

*Primary Examiner*—L. T. Hix
*Assistant Examiner*—Alan Mathews
*Attorney, Agent, or Firm*—Fitzpatrick, Cella, Harper & Scinto

[57] ABSTRACT

A shutter curtain holder device in a camera comprises a shutter curtain folded back on itself at one end thereof, a stem disposed inside the folded portion of the shutter curtain, and a shutter beam surrounding the folded portion of the shutter curtain. The shutter beam has indented portions formed adjacent to the upper and lower edges thereof. The indented portions lie between the one end portion of the shutter curtain and the stem to render the spacing between the opposed portions of the shutter curtain at the folded end portion smaller than the transverse dimension of the stem.

3 Claims, 3 Drawing Figures

SHUTTER CURTAIN HOLDER DEVICE

BACKGROUND OF THE INVENTION

1. Field of the Invention

This invention relates to a shutter curtain holder device for use in the shutter mechanism of a camera.

2. Description of the Prior Art

In the shutter mechanism of a camera, a shutter curtain has heretofore been held fast to a shutter curtain beam (hereinafter simply referred to as a beam) either by nipping the beam by means of the shutter curtain or by nipping the shutter curtain by means of the beam and by joining together the shutter curtain and the beam with the aid of an adhesive such as synthetic rubber or epoxy resin.

Since, however, such shutter curtain is subjected to a substantial pulling force provided by a driving spring which operates the shutter curtain, and the holding force of the adhesive is affected by temperature variations, or may be irregular in itself, such shutter curtain has suffered from the disadvantage that it peels off or slips down the beam.

To prevent the shutter curtain from peeling off or slipping down the beam, a holding method has also been employed according to which the shutter curtain is first nipped by the beam and then the beam is pressed at suitable points therein to afford additional security. However, this holding method also suffers from the disadvantage that the shutter curtain tends to tear at the points at which it is pressed by the beam.

SUMMARY OF THE INVENTION

We have conceived and contribute by the present invention a shutter curtain holder device which eliminates the abovenoted disadvantages and positively holds the shutter curtain to the beam.

According to the present invention, the shutter curtain holder device comprises a shutter curtain folded adjacent to one end thereof, a stem disposed inside the folded portion of the shutter curtain and a shutter beam surrounding the folded portion of the shutter curtain. The shutter beam has indented portions formed adjacent to opposite edges thereof and the indented portions lie between the one end portion of the shutter curtain and the stem and allows the spacing between the opposed portions of the shutter curtain at that end portion to be smaller than the transverse dimension of the stem.

The stem may comprise two small pieces disposed adjacent to at least the upper and lower edges of the shutter curtain. Each of the indented portions disposed adjacent to the upper and lower edges of the shutter curtain may include two indentations.

The shutter curtain may be a metal foil curtain shutter and the stem may be of a malleable material.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important therefore that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DESCRIPTION OF THE PREFERRED EMBODIMENTS

Figure 1:
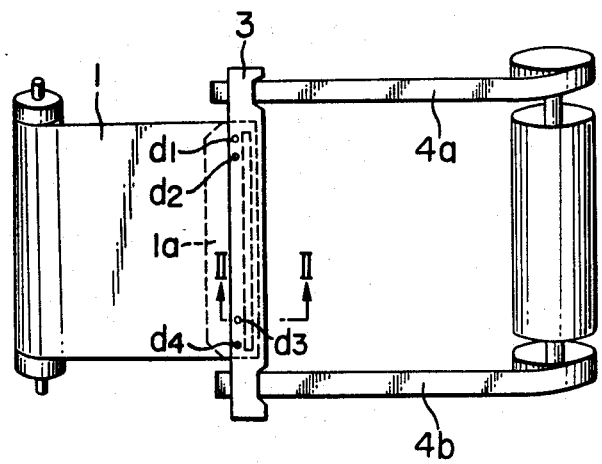
FIG. 1 is a schematic illustration of a shutter mechanism including a first embodiment of the present invention.
Figure 2:
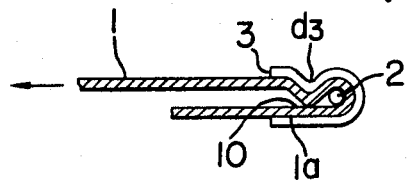
FIG. 2 is a cross-sectional view taken along line II-II in FIG. 1.

Referring to FIGS. 1 and 2, there is shown a shutter curtain 1 having a portion folded back on itself to provide a reverse flap 1a and a stem 2 disposed inside the folded portion 1a. A beam 3 has a median portion which is generally U-shaped in cross-section (FIG. 2) and embraces the folded portion 1a of the curtain 1; and the ends of the beam 3 are connected to cords 4a and 4b, respectively. The beam 3 is formed along at least one leg thereof with indented portions which comprise a plurality of dimples or indentations $d_1$, $d_2$, $d_3$ and $d_4$ which press the folded portion 1a of the shutter curtain to retain the stem 2 inside the folded portion of the curtain. As shown in FIG. 2, the clearance 10 in the folded portion of the shutter curtain which is in contact with the dimple $d_3$ is smaller than the transverse dimension of the stem 2 taken in a plane perpendicular to the plane of a major surface of the flap, i.e. the transverse dimension of the stem is that which extends across the bight of the U-shaped beam. However, the degree of pressure imparted to the shutter curtain by the dimples is such that the opposed portions of the shutter curtain undergo no pressure force. Thus, when the shutter curtain 1 is pulled in the direction of the arrow in FIG. 2, the shutter curtain 1 is firmly nipped between the dimples in the beam 3 and the stem 2, so that the shutter curtain can no longer slip down along the beam. More particularly, the shutter curtain 1 is prevented from slipping down by the self-locking action provided by the indentations or dimples of the beam 3 and the stem 2.

The above described construction is sufficient for the shutter curtain 1 to be held to the beam 3, but further safety may be ensured either by joining the shutter curtain 1 to the beam 3 with the aid of an adhesive agent or by joining together the overlapping portions of the shutter curtain with the aid of an adhesive. Also, the dimples on the beam 3 need not be pre-formed but may, instead, be formed as by stamping at suitable points of the beam 3 after the shutter curtain has been nipped by the beam.

Where a metal foil shutter curtain is employed as the shutter curtain, the stem 2 may desirably be of a material such as nylon yarn which is higher in malleability than the material of the metal foil shutter curtain. The reason is that if the stem 2 was lower in malleability than the material of the metal foil shutter curtain, the shutter curtain 1 might be so intensely nipped between the dimples $d_1$, $d_1$, $d_3$, $d_4$ and the stem 2 as to be torn when pulled with a substantial force in the direction of the arrow in FIG. 2.

Where a rubber curtain or a rubber-coated cloth curtain shutter is employed as the shutter curtain, the material of the stem 2 may be metallic because the shutter curtain itself is resilient and the thickness thereof is great enough to ensure sufficient strength.

In the first embodiment, if nylon yard for example is employed as the stem 2, a difficulty in the course of manufacture will be encountered inasmuch as the nylon yarn cannot readily be rectilinearly accommodated within the folded portion of the shutter curtain because a stock of nylon yarn is usually wound on a bobbin and tends to be curled when unwound.

Figure 3:
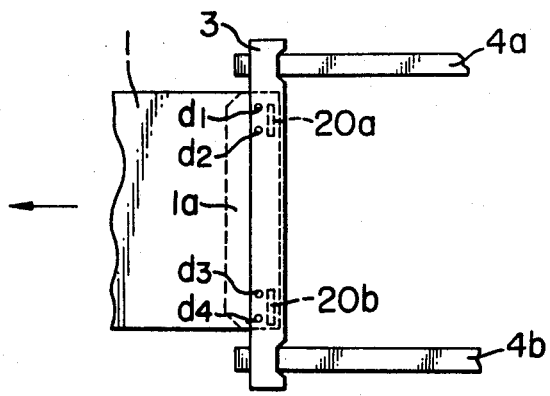
FIG. 3 schematically illustrates a second embodiment of the present invention.

FIG. 3 shows a second embodiment which overcomes such drawback. In FIG. 3, those similar functionally smilar to those in the first embodiment are given similar reference characters and need not be described. The stem in this embodiment is constituted by short lengths of nylon yard $20a$ and $20b$ disposed in the folded portion $1a$ of the shutter curtain adjacent to the upper and lower edges thereof, respectively, and these lengths of nylon yarn are retained inside the folded portion $1a$ of the shutter curtain by the dimples $d_1$, $d_2$ and $d_3$, $d_4$, respectively, in a manner similar to that described with respect to the first embodiment.

With such construction, the shutter curtain 1, when pulled in the direction of the arrow in FIG. 3, may be firmly nipped between the dimples $d_1$, $d_2$ and the length of nylon $20a$ and between the dimples $d_3$, $d_4$ and the length of nylon $20b$, and thus the shutter curtain may be positively held to the beam 3. At the same time, the nylon yarn in the form of short lengths is free from curling and advantageous in the manufacture of the device.

Further, the central part of the folded portion $1a$ of the shutter curtain lacks the stem and is thus free from the possibility of wrinkles being created in such portion of the shutter curtain.

In the second embodiment shown in FIG. 3, it will be noted that the beam has the dimples $d_1$, $d_2$ corresponding to the short length $20a$ of yarn and the dimples $d_3$, $d_4$ corresponding to the short length $20b$, in order to ensure that the stem pieces will be positively secured inside the shutter curtain.

In the first embodiment shown in FIG. 1, four dimples $d_1$, $d_2$, $d_3$ and $d_4$ are formed on the beam, but where a single continuous stem is employed, two dimples will be sufficient, one adjacent to the upper edge and one adjacent to the lower edge of the shutter curtain.

We believe that the construction and operation of our novel shutter curtain holder device will now be understood and that the advantages thereof will be fully appreciated by those persons skilled in the art.

We claim:

1. A shutter curtain holder device for use in a camera, comprising:
   (a) a shutter curtain folded adjacent to one end thereof to provide a reverse flap;
   (b) a stem disposed inside the folded portion of said shutter curtain and comprising at least two short elements disposed adjacent to the upper and lower edges of said shutter curtain, respectively;
   (c) a shutter beam surrounding said folded portion of said shutter curtain, said shutter beam having indented portions formed adjacent to the ends thereof, each of said indented portions lying between said one end of said shutter curtain and said stem to render the spacing between the opposed portions of said shutter curtain smaller than the transverse dimension of said stem taken in a plane perpendicular to the plane of a major surface of said flap, each of said indented portions of said beam including two dimples, one of said indented portions being disposed adjacent respective of said two elements.

2. A shutter curtain holder device as defined in claim 1, wherein said shutter curtain is made of a metal foil and said stem is of a malleable material.

3. A shutter curtain holder device for use in a camera, comprising:
   (a) a shutter curtain folded adjacent to one end thereof to provide a reverse flap;
   (b) a stem disposed inside the folded portion of said shutter curtain, said stem comprising at least two short elements disposed adjacent to the upper and lower edges of said shutter curtain respectively.
   (c) a shutter beam surrounding said folded portion of said shutter curtain, said shutter beam being folded with two indentations for each of said short elements, each of said indentations lying between said one end of said shutter curtain and said stem to render the spacing between the opposed portions of said shutter curtain smaller than the transverse dimension of said stem taken in a plane perpendicular to the plane of a major surface of said flap.

* * * * *